United States Patent [19]
Hieda et al.

[11] Patent Number: 4,901,152
[45] Date of Patent: Feb. 13, 1990

[54] IMAGE PICKUP APPARATUS

[75] Inventors: Teruo Hieda; Toshiyuki Masui, both of Kawasaki; Koji Takahashi, Yokohama; Katsuji Yoshimura, Kawasaki, all of Japan

[73] Assignee: Canon Kabushiki Kaisha, Tokyo, Japan

[21] Appl. No.: 236,141

[22] Filed: Aug. 25, 1988

[30] Foreign Application Priority Data

Aug. 31, 1987 [JP] Japan ................................. 62-217377
Sep. 25, 1987 [JP] Japan ................................. 62-240282

[51] Int. Cl.⁴ .............................................. H04N 9/73
[52] U.S. Cl. ...................................... 358/209; 358/29
[58] Field of Search ................. 358/29 C, 209, 213.27

[56] References Cited
U.S. PATENT DOCUMENTS 4,682,210  7/1987  Ikemura et al. .................... 358/29 C
4,727,413  7/1985  Miura et al. ....................... 358/29 C
4,739,393  11/1986 Seki et al. .......................... 358/29 C

FOREIGN PATENT DOCUMENTS 0200694  10/1985  Japan ................................ 358/29 C
62-108678  5/1987  Japan .

Primary Examiner—Jin F. Ng
Assistant Examiner—Stephen Brinich
Attorney, Agent, or Firm—Fitzpatrick, Cella, Harper & Scinto

[57] ABSTRACT

An image pickup apparatus which alternately performs 1/n-sec light storage and 1/m-sec light storage (m>n), and outputs an image pickup signal obtained by mixing a 1/n-sec stored image and a 1/m-sec stored image. The apparatus has a circuit for separately controlling white balance of the 1/n-sec stored image portion and the 1/m-sec stored image portion.

11 Claims, 8 Drawing Sheets

IMAGE PICKUP APPARATUS

BACKGROUND OF THE INVENTION

1. Field of the Invention

The present invention relates to an image pickup apparatus and, more particularly, to an image pickup apparatus suitable for an image pickup section of a video recording apparatus integrated with a camera, or a still video recording system.

2. Related Background Art

A video camera has a narrow dynamic range as compared to a silver chloride photographing system. In a back-light state, overexposure and underexposure states (wherein brightness levels are considerably high and low) occur, a diaphragm must be manually adjusted in a conventional video camera, or light-amount correction by stopping down the diaphragm by 1 to 2 steps is often performed in a camera having a back-light correction function However, even if back-light correction is appropriately performed and a main object to be photographed is photographed with an appropriate exposure, an overexposure (or underexposure) occurs on its background, and the entire frame tends to become an image with only a whitish background. In this manner, the narrow dynamic range problem is left unsolved.

In an image pickup apparatus using an image pickup element such as a CCD image sensor, color separation is performed by color filters (e.g., R, G, and B) arranged in front of the element, and luminance (Y) signals and color (C) signals are formed from charges stored in photoelectric converters corresponding to the colors.

FIGS. 1A and 1B are views showing the relationship between a charge storage time and a stored charge amount of the image pickup element. A storage time required for forming an NTSC signal is about 1/60 sec. When the luminance level of an object to be photographed (including a background) is low, as shown in FIG. 1A, stored charge amounts corresponding to R, G, and B are balanced, and colors of respective portions can be well reproduced. However, when the luminance level of the object is high, as shown in FIG. 1B, one of R, G, and B is saturated (B is saturated in FIG. 1B), and as a result, a false color is reproduced.

As a conventional method of solving this problem, the following processing method is generally known. A high-level portion of the Y signal is detected, and the color signal of the detected portion is suppressed. In this conventional processing method, however, when the Y signal exceeds a given value X, no color can be reproduced. For example, a clear blue sky is reproduced in white.

SUMMARY OF THE INVENTION

The assignee of the subject application has filed another application regarding an image pickup apparatus which can substantially widen the dynamic range. It is an object of the present invention to provide an image pickup apparatus which can solve the problem of white balance occurring with such image pickup apparatus.

It is another object of the present invention to provide an image pickup apparatus which is free from drawbacks due to a false color signal or color suppression.

An image pickup apparatus according to an embodiment of the present invention is characterized in that the apparatus alternately performs 1/n-sec light storage and 1/m-sec light storage (m>n), and outputs an image pickup signal obtained by mixing a 1/n-sec stored image and a 1/m-sec stored image. The apparatus has a circuit for separately controlling the white balance of the 1/n-sec stored image portion, and the 1/m-sec stored image portion.

Since a circuit for separately controlling white balance is provided, appropriate white balance can be achieved for each stored image portion, and hence, good white balance can be realized in the whole image.

An image pickup apparatus according to another embodiment of the present invention is characterized by comprising image pickup means capable of fetching a plurality of frames in different exposure states, and processing means for adaptively switching or calculating color signals of the plurality of frames in the different exposure states.

The switching or calculating operation of the processing means is executed in accordance with the luminance signal level formed by the image pickup means. Thus, high color reproducibility can be achieved in a high-luminance portion.

The above and other objects and features of the present invention will become apparent from the following embodiments taken in conjunction with the accompanying drawings.

DETAILED DESCRIPTION OF THE PREFERRED EMBODIMENTS

An embodiment of the present invention will be described hereinafter with reference to the accompanying drawings.

Figure 1A:
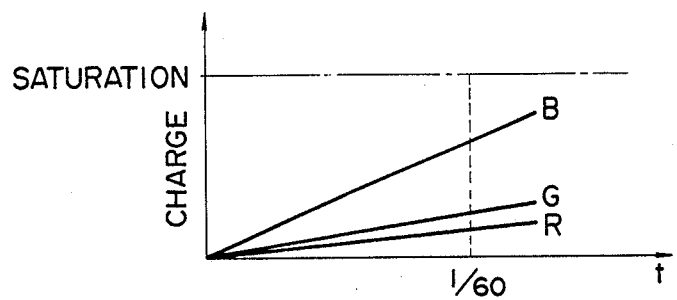
FIGS. 1A to 1C are graphs of the related background art.
Figure 1B:
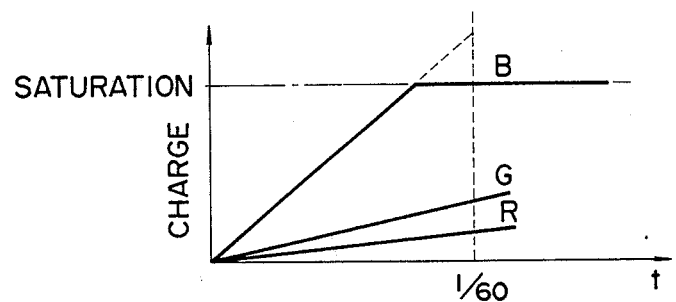
Figure 1C:
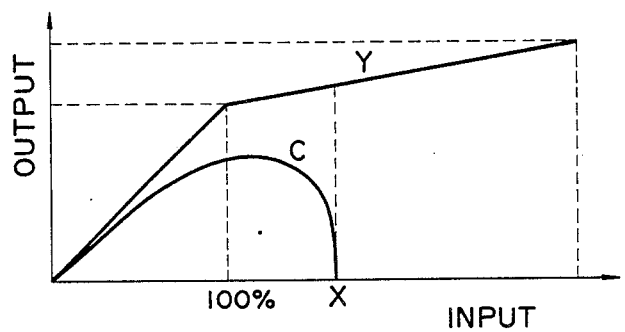
Figure 2A:
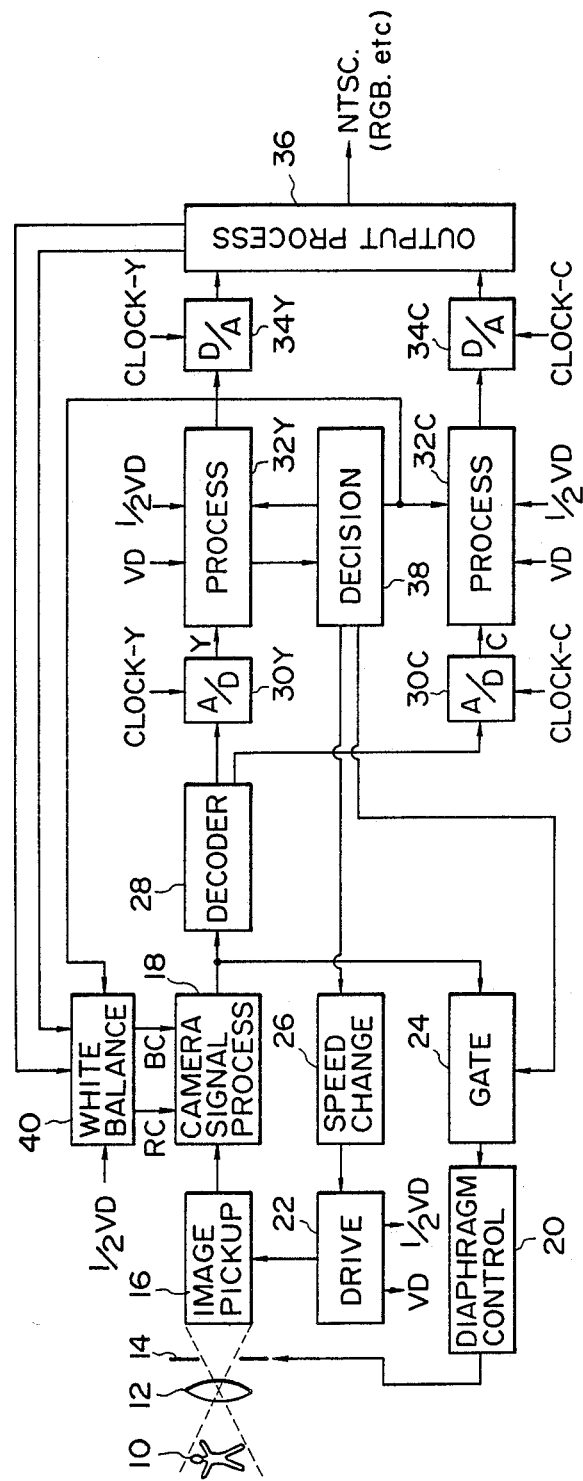
FIG. 2A is a block diagram showing the overall arrangement of an embodiment of the present invention.

In FIG. 2A, an image of an object 10 is picked up by an image pickup element 16 through a photographing lens 12 and a diaphragm 14. The amount of light beam passing from the object 10 through the photographing lens 12 is regulated by the diaphragm 14, and the light is incident on a photoelectric conversion surface of the image pickup element 16. A camera signal processing circuit 18 performs various signal processing operations such as γ correction as in a normal video camera. A diaphragm control circuit 20 controls the diaphragm 14. A driver 22 drives the image pickup element 16. A gate circuit 24 allows some of outputs from the camera signal processing circuit 18 (e.g., signals of a central portion of a frame) to pass therethrough. A speed change circuit 26 changes a charge storage time of the image pickup element 16.

An output from the camera signal processing circuit 18 is separated into a luminance (Y) signal and a time-divisional multiplexed base-band color-difference (C) signal by a decoder 28. The Y and C signals are respectively applied to signal processing circuits 32Y and 32C through A/D converters 30Y and 30C. The signal processing circuits 32Y and 32C convert pixel data, as will be described later. The outputs from the circuits 32Y and 32C are respectively supplied to an output processing circuit 36 through D/A converters 34Y and 34C, respectively. The output processing circuit 36 forms a composite video signal from the input signals, and outputs the obtained signal.

A decision circuit 38 detects the presence/absence of the underexposure or overexposure state from the Y signal, and supplies, in accordance with its decision result, a change instruction signal to the speed change circuit 26, and a control signal to the gate circuit 24. This apparatus also includes a white balance circuit 40 (to be described later in detail).

Figure 2B:
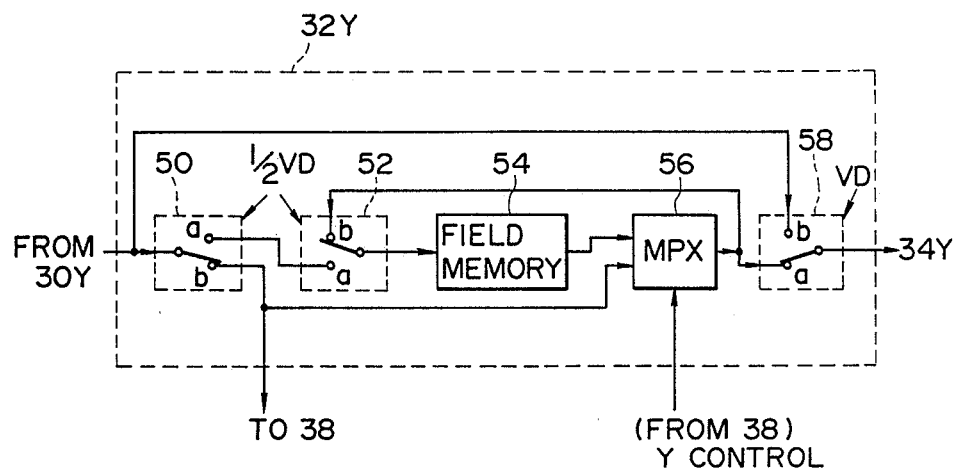
FIG. 2B is a block diagram showing an arrangement of a processing circuit 32Y shown in FIG. 2A.

The processing circuits 32Y and 32C will be described in detail below. FIG. 2B shows the processing circuit 32Y. The processing circuit 32C can have the same arrangement as that of the circuit 32Y. In FIG. 2B, the output from the A/D converter 30Y is supplied to switches 50 and 58. The switch 50 is connected to a contact b in a normal mode (when a picked-up image includes neither overexposure nor underexposure states), and is alternately connected to contacts a and b in units of 60 sec in a pixel conversion mode (when a picked-up image includes the overexposure and underexposure states). Note that in the pixel conversion mode, the driver 22 drives the image pickup element 16 such that 1/60-sec charge storage and 1/1000-sec charge storage are alternately repeated every field. The switch 50 is connected to the contact a for a 1/1000-sec stored image, and is connected to the contact b for a 1/60-sec stored image. The 1/60-sec stored image at the contact b of the switch 50 is supplied to the decision circuit 38 and a multiplexer 56.

In the normal mode, the multiplexer 56 outputs the 1/60-sec stored image supplied every field, and in the pixel conversion mode, performs pixel conversion between the 1/60-sec stored image from the contact b of the switch 50 and the 1/1000-sec stored image from a field memory 54, and outputs the pixel-converted output in an odd-numbered field. In an even-numbered field, the multiplexer 56 directly outputs the pixel converted image from the field memory 54. The switch 58 is normally connected to a contact a, and is connected to a contact b in a vertical blanking period. This is to form an interlaced scanning signal.

Figure 4:
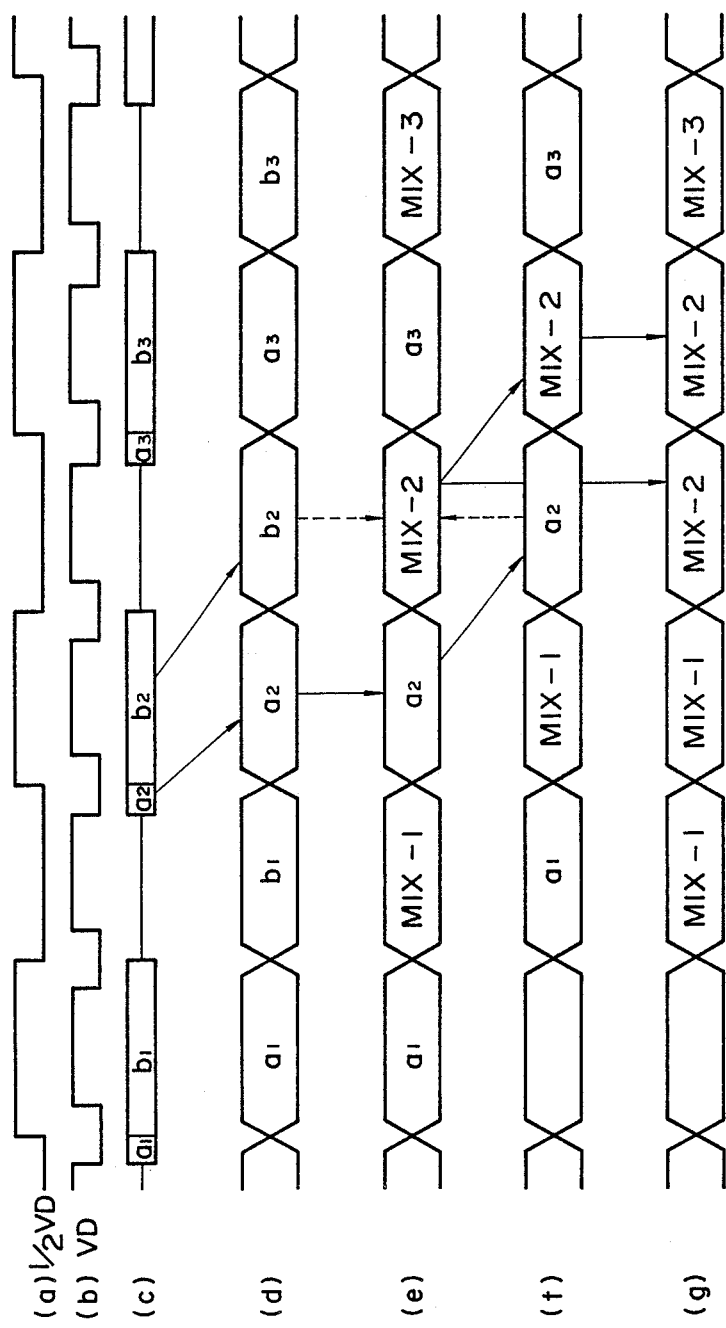
FIG. 4 is a series of timing charts of the FIG. 2A embodiment.

The operation of the switch 52, the field memory 54, and the multiplexer 56 in the pixel conversion mode will be described hereinafter with reference to FIG. 4. FIG. 4(a) shows a switch control signal for the switches 50 and 52. When the signal shown in FIG. 4(a) is at logic "H" level, the switches 50 and 52 are connected to their contacts a; and when "L" level, connected to their contacts b. FIG. 4(b) shows a switch control signal for the switch 58. When the signal shown in FIG. 4(b) is at logic "H" level, the switch 58 is connected to the contact a; and when "L" level, connected to the contact b. FIG. 4(c) shows a charge storage operation of the image pickup element 16. In FIG. 4(c), $a_n$ and $b_n$ indicate charge storage times (in this embodiment, 1/1000-sec and 1/60-sec). FIG. 4(d) shows the output from the image pickup element 16. FIG. 4(e) shows a signal written in the field memory 54, FIG. 4(f) shows a signal read out from the field memory 54, and FIG. 4(g) shows the output from the multiplexer 56. Note that the field memory 54 is a memory capable of simultaneously performing write and read access operations.

$a_1$ as a 1/1000-sec stored image is delayed by one field period by the field memory 54, and is subjected to pixel conversion with a 1/60-sec stored image $b_1$ of the next field by the multiplexer 56. A pixel-converted image MIX-1 is supplied to the switch 58, and is also written in the field memory 54 through the switch 52. The image MIX-1 is delayed by one field period, and is supplied to the multiplexer 56. In this case, since the multiplexer 56 receives only the image MIX-1, the multiplexer 56 outputs the image MIX-1 to the switch 58 again.

Thereafter, the same processing as described above is performed, and the multiplexer 56 outputs images MIX-1, MIX-1, MIX-2, MIX-2, .... After pixel conversion may be performed between $a_1$ and $b_1$, pixel conversion is performed between $b_1$ and $a_2$ in the next field, thereby improving a time resolution. However, the images $b_1$ and $a_2$ have a large time lag and a possibility of causing an error in an animation is high.

Figure 3:
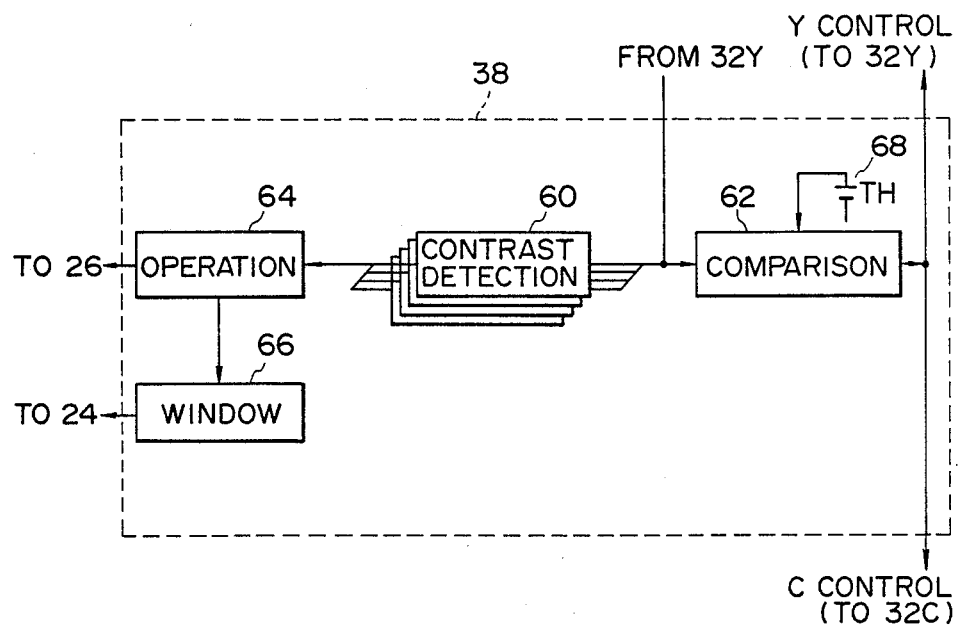
FIG. 3 is a block diagram showing an arrangement of a decision circuit 38 shown in FIG. 2A.

FIG. 3 is a block diagram of the detailed arrangement of the decision circuit 38. A 1/60-sec stored Y signal from the processing circuit 32Y (more specifically, the contact b of the switch 50) is supplied to a contrast detection circuit 60 and a comparator 62 for detecting overexposure. The contrast detection circuit 60 detects maximum and minimum values of a luminance level of a 1-field frame, and supplies the detected values to an operation circuit 64. The operation circuit 64 calculates a difference between the maximum and minimum values. The operation circuit 64 supplies a control signal to the speed change circuit 26 so that the circuit 26 is set in the pixel conversion mode when the difference is larger than a predetermined value and is set in the normal mode when it is equal to or smaller than the predetermined value. The operation circuit 64 comprises, e.g., a conventional microcomputer. The operation circuit 64 outputs photometric window data to window generating circuit 66. The comparator 62 compares the Y signal from the processing circuit 32Y with a threshold value TH from a threshold value generator 68. When the Y signal is lower than the value TH, the comparator 62 outputs an output "L"; otherwise, it outputs an output "H". In accordance with the output from the comparator 62, the presence/absence of overexposure can be detected.

The output from the comparator 62 is supplied to the processing circuit 32Y as a Y control signal, and to the processing circuit 32C and the white balance circuit 40 as a C control signal. These circuits select a 1/60-sec stored image when the output from the comparator 62 is at "L" level, and select a 1/1000-sec stored image when it is at "H" level.

The decision circuit 38 may employ an arrangement for deciding an underexposure state using a 1/1000-sec stored image as an input luminance. However, overexposure detection can be more accurately performed than underexposure detection, and switching of the normal mode and the pixel conversion mode must be performed under the identical storage condition. In this embodiment, therefore, a 1/60-stored image is input to the decision circuit 38.

Figure 5:
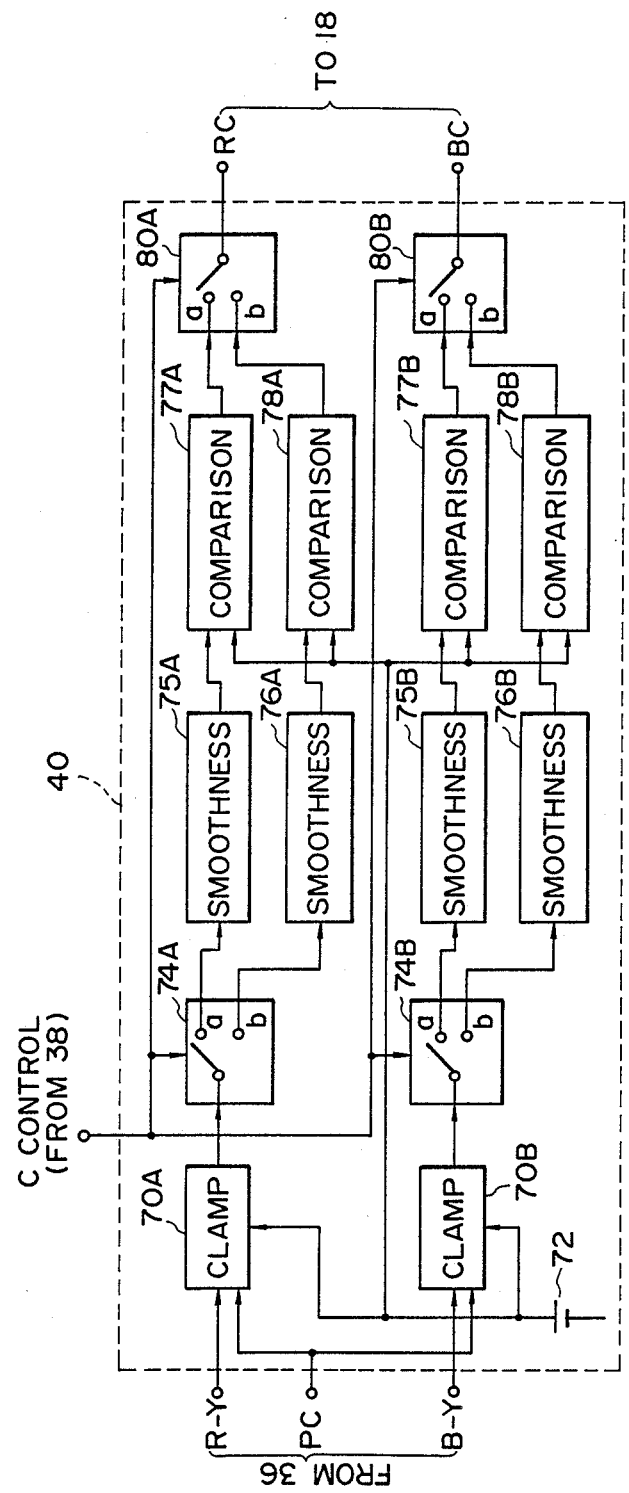
FIG. 5 is a block diagram showing an arrangement of a white balance circuit 40.

FIG. 5 is a block diagram showing the detailed arrangement of the white balance circuit 40. Color difference signals R-Y and B-Y from the output processing circuit 36 are clamped at a reference voltage 72 by clamp circuits 70A an 80B in accordance with a clamp pulse PC from a sync signal generating circuit (not shown). Switches 74A and 74B are switched between contacts a and b in accordance with the C control signal from the decision circuit 38, and supply their outputs to smoothness circuits 75A and 75B; and 76A and 76B, respectively. Signals smoothed by the smoothness circuits 75A and 75B; and 76A and 76B are respectively supplied to comparators 77A and 77B; and 78A and 78B, and are compared with the reference voltage 72. The outputs from the comparators 77A and 77B; and 78A and 78B are selected by switches 80A and 80B. The switches 80A and 80B are switched between contacts a and b in accordance with the C control signal from the decision circuit 38 as in the switches 74A and 74B. An output from the switch 80A serves as a red control signal RC, and an output from the switch 80B serves as a blue control signal BC. These control signals respectively control gains of red- and blue-signal variable gain amplifiers for controlling white balance in the camera signal processing circuit.

For example, the red signal will be explained below. The gain of the red-signal variable gain amplifier is subjected to negative feedback control so that a difference between the two input signals of the comparator 77A or 78A becomes zero. This amplifier operates such that two color difference signals separated by the switch 74A are respectively set at zero level. These two color difference signals respectively correspond to image pickup signals in the 1/60- and 1/1000-sec storage modes, and white balance control is performed for each image pickup signal.

Figure 6:
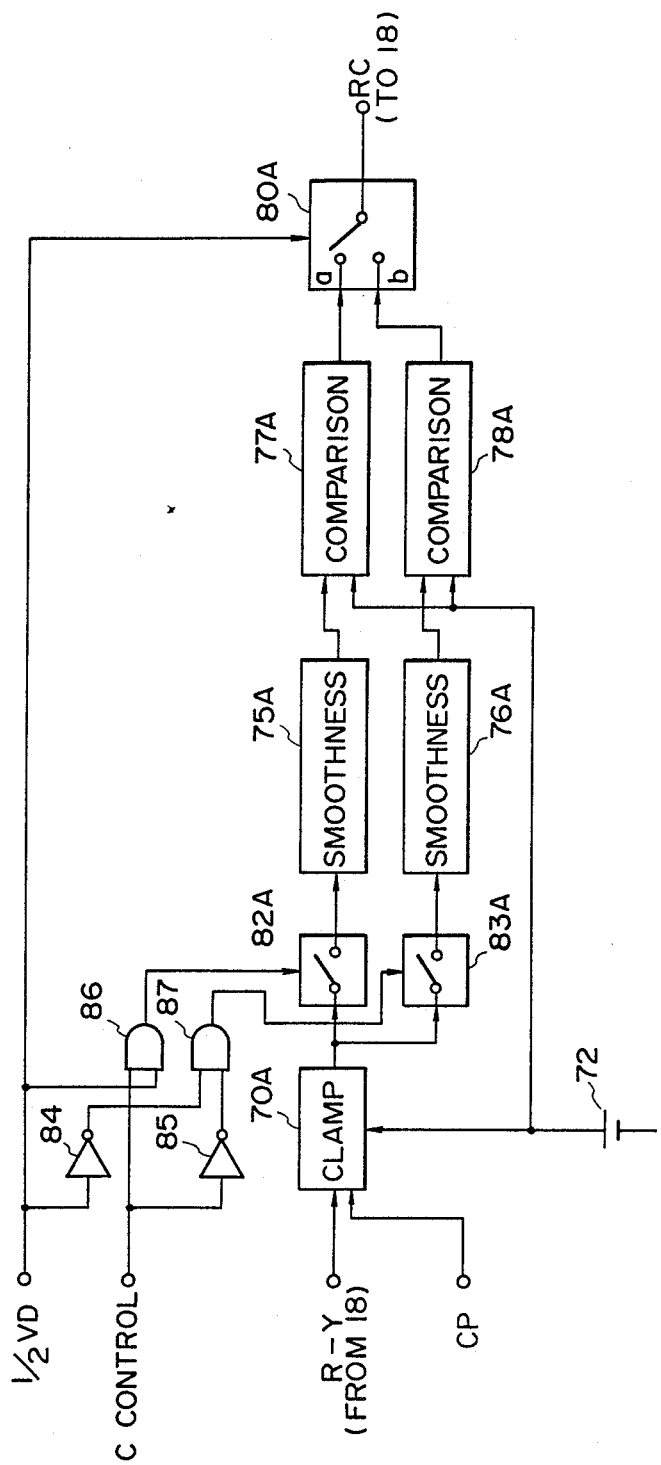
FIG. 6 is a block diagram showing another arrangement of the white balance circuit 40.

FIG. 6 shows a modification of the white balance circuit 40. FIG. 6 illustrates only a red signal system. The color difference signal R-Y from the camera signal processing circuit 18 is used as an input signal. The input signal R-Y is clamped at the reference voltage 72 by the clamp circuit 70A in accordance with the clamp pulse CP, and is supplied to switches 82A and 83A. The switches 82A and 83A are opened/closed by a logic circuit consisting of inverters 84 and 85 and AND gates 86 and 87, a signal ½VD, and the C control signal. More specifically, when both the signal ½VD and the C control signal are at "1" level, the switch 82A is closed. When both the signals are at "0" level, the switch 83A is closed. Otherwise, both the switches 82A and 83A are kept opened.

Outputs from the switches 82A and 83A are supplied to smoothness circuits 75A and 76A, respectively, and outputs from the smoothness circuits 75A and 76A are compared with the reference voltage 72 by the comparators 77A and 78A in the same manner as in FIG. 5. One of the comparison results is selected by a switch 80A. In the case of FIG. 6, the switch 80A is open/close-controlled by the signal ½VD.

In the arrangement shown in FIG. 6, the switch 82A supplies a portion of the 1/60-stored image pickup signal, which is extracted by the C control signal, to the smoothness circuit 75A. The switch 83A supplies a portion of the 1/1000-sec stored image pickup signal, which is extracted by the C control signal, to the smoothness circuit 76A. Therefore, an output from the comparator 77A controls the white balance of the 1/60-sec stored image pickup signal, and an output from the comparator 78A controls the white balance of the 1/1000-sec stored image pickup signal.

In this embodiment, a feedback loop for controlling white balance is always formed. However, switches and memories are connected to the outputs of the comparators, so that the feedback loop may be formed when the switches are closed Color data near an object is obtained by an optical system other than the image pickup optical system, and white balance control can be performed based on the obtained color data. In this case, color data in different directions are obtained by a plurality of color detectors, and outputs from these detectors can be switched as described above.

As can be easily understood from the above description, an image pickup signal which can well reproduce an object having very high contrast can be obtained.

A second embodiment of the present invention will be described hereinafter with reference the drawings.

Figure 7:
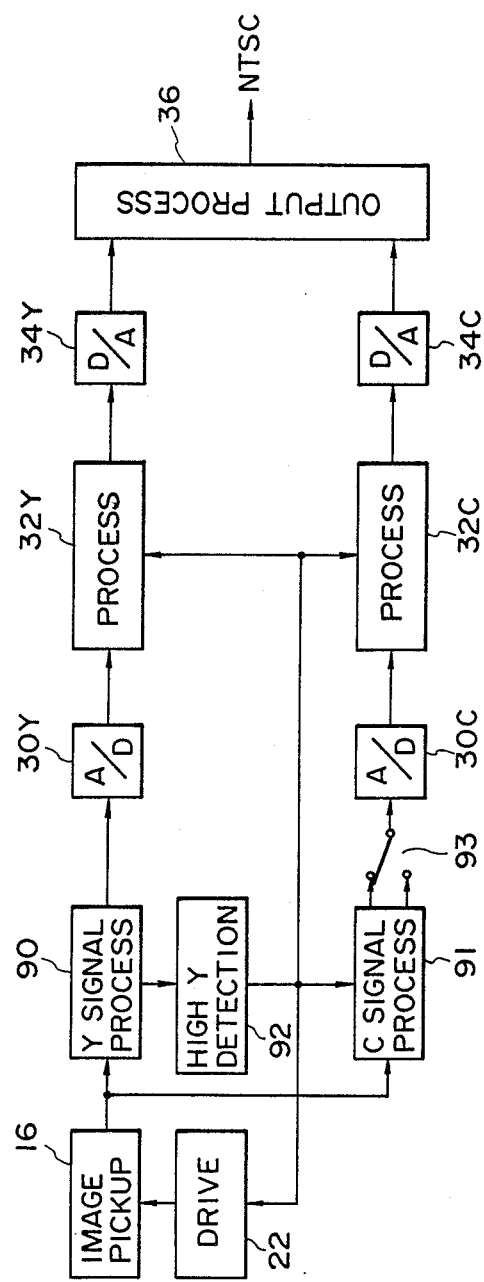
FIG. 7 is a block diagram showing the overall arrangement according to another embodiment of the present invention.

In FIG. 7, a light beam from an object is focused on a CCD image pickup element 16 through an optical system and a diaphragm (neither are shown). A driver 22 drives the image pickup element 16, as will be described later. A luminance signal processing circuit 90 forms a luminance signal from an output from the image pickup element 16, and performs known processing, e.g., $\gamma$ correction, AGC, and the like. A color signal processing circuit 91 forms two color difference signals R-Y and B-Y from the output from the image pickup element 16, and performs known processing such as $\gamma$ correction, white balance correction, and the like. A high-luminance detection circuit 92 detects a high-level portion of a luminance signal obtained from the luminance signal processing circuit 90. The color signal processing circuit 91 suppresses the levels of the corresponding portions of the color difference signals R-Y and B-Y in accordance with a detection signal from the circuit 92.

The output from the luminance signal processing circuit 90 is converted into a digital signal by an A/D converter 30Y, and is supplied to a processing circuit 32Y. The processing content of the processing circuit 32Y will be described later. An output from the processing circuit 32Y is supplied to an output processing circuit 36 through a D/A converter 34Y. Meanwhile, two outputs R-Y and B-Y from the color signal processing circuit 91 are converted to a time-divisional multiplexed signal by a switch 93, and the multiplexed signal is then supplied to an A/D converter 30C. The digital signal from the A/D converter 30C is supplied to a processing circuit 30C. An output from the processing circuit 30C is supplied to the output processing circuit 36 through a D/A converter 34C. The output processing circuit 36 forms a composite video signal from the luminance signal and the color signal, and outputs the obtained signal.

The driving method of the image pickup element 16 and the correction method of the color signal as the characteristic features of this embodiment will be described below. Note that in the following description, a normal operation state wherein correction of a color signal is unnecessary is called a normal mode, and an operation state wherein correction of the color signal is necessary is called a correction mode. In the illustrated embodiment, these modes are selected and switched in accordance with an output from the high-luminance detection circuit 92. More specifically, when the high-luminance detection circuit 92 detects a high-luminance level portion exceeding a predetermined level, the correction mode is selected. When not detected, the normal mode is selected. The output from the high-luminance detection circuit 92 is supplied to the driver 22 and the processing circuits 32Y and 32C.

In the normal mode, the driver 22 drives the image pickup element 16 so that the element 16 repeats charge storage for about 1/60-sec every field. In the correction mode, as shown in FIG. 4, the driver 22 drives the image pickup element 16 such that charge storage for about 1/60-sec and charge storage for about 1/1000-sec are repeated every two fields.

Figure 8:
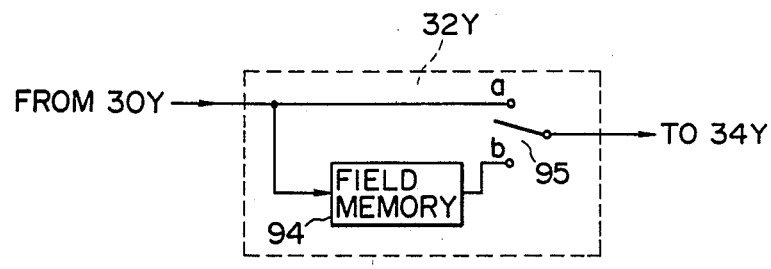
FIG. 8 is a block diagram showing a processing circuit 32Y shown in FIG. 7.

FIG. 8 shows an internal arrangement of the processing circuit 32Y. The processing circuit 32Y includes a field memory 94 which can simultaneously perform write and read access operations, preferably, and a switch 95. In the normal mode, the switch 95 is normally connected to a contact a, and directly outputs a 60-sec stored image signal supplied from the A/D converter 30Y. In the correction mode, the switch 95 is switched between the contacts a and b every field. More specifically, when a 1/60-sec stored image signal is supplied from the A/D converter 30Y, the switch 95 is connected to the contact a. When a 1/1000-sec stored image signal is supplied, the switch 95 is connected to the contact b, and the 1/60-sec stored image signal of the immediately preceding field from the field memory 94 is supplied to the D/A converter 34Y.

Figure 9:
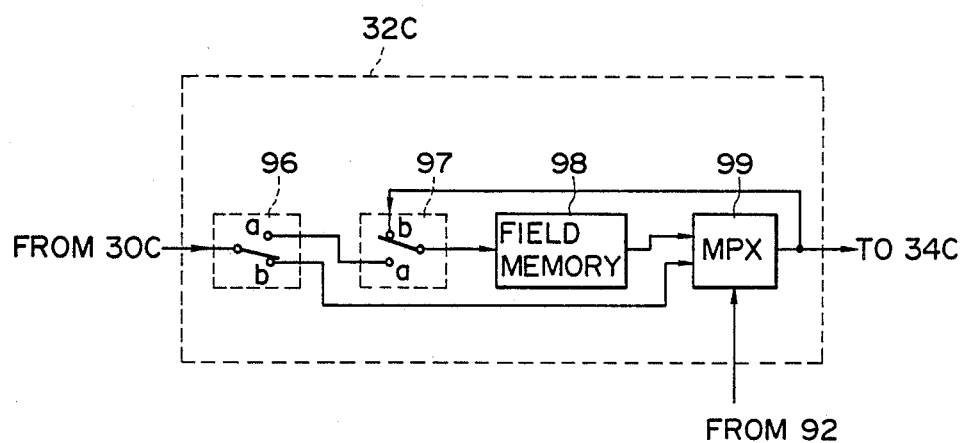
FIG. 9 is a block diagram showing an arrangement of a processing circuit 32C shown in FIG. 7.

FIG. 9 shows an internal arrangement of the processing circuit 32C. The processing circuit 32C includes switches 96 and 97, a field memory 98, and a multiplexer 99. In the normal mode, the switch 96 is normally connected to the contact b, and the multiplexer 99 directly outputs the signal from the A/D converter 30C. In the correction mode, the switches 96 and 97 are alternately switched between contacts a and b every field. More specifically, in a field wherein a 1/60-sec stored image signal is supplied from the A/D converter 30C, the switches 96 and 97 are connected to the contacts b. In a field wherein a 1/1000-sec stored image signal is supplied, the switches 96 and 97 are connected to the contacts a.

The operation of the circuit shown in FIG. 9 in the correction mode will be described below with reference to FIG. 4. In FIG. 4, $a_n$ indicates a 1/1000-sec stored image, and $b_n$ indicates a 1/60-sec stored image FIG. 4(a) shows a clock pulse having a duty ratio of 50%. The charge storage and read access of the image pickup element 16, and switch control operation are performed based on this pulse. FIG. 4(c) shows the charge storage operation of the image pickup element 16, and FIG. 4(d) shows a read operation of the charge stored as shown in FIG. 4(c). FIG. 4(e) shows a signal written in the field memory 98. When the 1/1000-sec stored image is supplied, since the switches 96 and 97 are connected to the contact a, the image is written in the memory 98. When the 1/60-sec stored image is supplied, since the switches 96 and 97 are connected to the contact b, a multiplexed image from the multiplexer 99 is written in the field memory 98. FIG. 4(f) shows the output from the field memory 98, which is obtained by delaying the signal shown in FIG. 4(e) by a one-field period. FIG. 4(g) shows the output from the multiplexer 99.

When the multiplexer 99 receives the 1/60-sec stored image (e.g., $b_2$) supplied from the contact b of the switch 96, and the 1/1000-sec stored image (e.g., $a_2$) from the field memory 98, it multiplexes both the signals. However, when the high-luminance detection circuit 92 detects a high luminance level, the multiplexer 99 selects the 1/1000-sec stored image. A multiplexed image MIX-1 is written in the field memory 98, and is read out one field later.

In this embodiment, 1/1000- and 1/60-sec stored images are exchanged. Of course, the above embodiment can be achieved not by exchange but by an arithmetic operation. The charge storage times of the image pickup element 16 are not limited to 1/60-sec and 1/1000-sec.

As can be understood from the above description, according to the present invention, no false color is generated even in a high-luminance portion, and hence, and colors can be prevented from being whitish.

What is claimed is:

1. An image pickup apparatus comprising:
   (a) an image pickup section for alternately performing light storage for a first period and light storage for a second period shorter than the first period, and for outputting an image pickup signal obtained by mixing an image stored in the first period and an image stored in the second period; and
   (b) white balance control means for separately performing white-balance control of the stored image portion of the first period and the stored image portion of the second period obtained from the image pickup signal.

2. An apparatus according to claim 1, wherein the first period is almost equal to a television field period.

3. An apparatus according to claim 1 or 2, wherein the second period is equal to or shorter than a field blanking period of a television signal.

4. An apparatus according to claim 1, wherein said image pickup section comprises a memory for mixing the images.

5. An apparatus according to claim 1, wherein said white balance control means independently performs white balance control operations of the stored image portions of the first and second periods based on image pickup signals of the stored image portions of the first and second periods, respectively.

6. An apparatus according to claim 1, further comprises mixing control means for controlling a mixed state in accordance with luminance levels of the stored image portions of the first and second periods.

7. An image pickup apparatus comprising:
   (a) image pickup means for alternately outputting a first image pickup signal for a first storage period, and a second image pickup signal for a second storage period;
   (b) detecting means for detecting levels of the first and second image pickup signals; and
   (c) mixing means for selecting color signals from the first and second image pickup signals in accordance with an output from said detecting means, and then outputting the obtained signal.

8. An apparatus according to claim 7, wherein the first period is almost equal to a television field period.

9. An apparatus according to claim 7 or 8, wherein the second period is equal to or shorter than a field blanking period of a television signal.

10. An apparatus according to claim 7, wherein said mixing means includes a memory.

11. An apparatus according to claim 7, wherein said mixing means includes selection means for selectively outputting color signals from the first and second image pickup signals.

* * * * *

UNITED STATES PATENT AND TRADEMARK OFFICE
CERTIFICATE OF CORRECTION

PATENT NO. : 4,901,152          Page 1 of 2

DATED : February 13, 1990

INVENTOR(S) : Teruo Hieda, et al.

It is certified that error appears in the above-identified patent and that said Letters Patent is hereby corrected as shown below:

[56] References Cited:

Under "U.S. PATENT DOCUMENTS":

"4,727,413   7/1985   Miura et al." should read
    --4,727,413   2/1988   Miura et al.--.

"4,739,393   11/1986   Seki et al." should read
    --4,739,393   4/1988   Seki et al.--.

COLUMN 1:

Line 15, "(wherein" should read --(respectively, cases wherein--.

COLUMN 2:

Line 59, "beam" should be deleted.

COLUMN 5:

Line 7, "clamp circuits 70A an 80B" should read --clamp circuits 70A and 70B--.

UNITED STATES PATENT AND TRADEMARK OFFICE
CERTIFICATE OF CORRECTION

PATENT NO. : 4,901,152

DATED : February 13, 1990

INVENTOR(S) : Teruo Hieda, et al.

It is certified that error appears in the above-identified patent and that said Letters Patent is hereby corrected as shown below:

COLUMN 6:

Line 9, "closed" should read --closed.--

COLUMN 7:

Line 46, "image" (second occurrence) should read --image.--.

Signed and Sealed this

Twenty-eighth Day of May, 1991

Attest:

Attesting Officer

HARRY F. MANBECK, JR.

Commissioner of Patents and Trademarks